United States Patent [19]

Carieri

[11] Patent Number: 5,378,480
[45] Date of Patent: Jan. 3, 1995

[54] METHOD OF PREPARING AN OXYGENATED COCKTAIL FOR INGESTING BY A HUMAN

[76] Inventor: Richard A. Carieri, 10928 Remmet Ave., Chatsworth, Calif. 91311

[21] Appl. No.: 937,176

[22] Filed: Aug. 31, 1992

[51] Int. Cl.⁶ ............................................. A23L 2/00
[52] U.S. Cl. ...................................... 426/67; 426/590
[58] Field of Search .................. 426/2, 312, 569, 590, 426/67

[56] References Cited

U.S. PATENT DOCUMENTS

| | | | |
|---|---|---|---|
| 3,728,129 | 4/1973 | Sargeant | 426/569 |
| 4,027,045 | 5/1977 | Fedotkia et al. | 426/312 |
| 5,006,352 | 4/1991 | Zoltai et al. | 426/590 X |

*Primary Examiner*—Frank Spear
*Attorney, Agent, or Firm*—Jack C. Munro

[57] ABSTRACT

The method of preparing an oxygenated nutritional beverage for individual consumption by a human where the human utilizes an individual sized beverage container within which is deposited a precise quantity of a nutritional powder with this powder including a foam generating substance(s) which is to be capable of trapping and temporarily holding oxygen gas. A preselected approximate quantity of a liquid is to be added to the powder within the beverage container with such being evenly mixed producing a foamy solution. Utilizing separate hand-holdable oxygen canister which has elongated dispensing tube with the outlet of the dispensing tube be located within the beverage solution within the container and the outlet located along the bottom surface of the beverage. The dispensing tube is to be moved continuously along, the bottom surface of the beverage for approximately six seconds in time while the canister is activated to dispense the oxygen gas. The tube is now removed and the oxygenated beverage to be consumed as soon as possible (certainly within the next two minutes).

9 Claims, 1 Drawing Sheet

METHOD OF PREPARING AN OXYGENATED COCKTAIL FOR INGESTING BY A HUMAN

BACKGROUND OF THE INVENTION

1. Field of the Invention

The field of this invention relates to a beverage that is to be consumed by a human and more particularly to a beverage which is specially formulated to be nutritional and includes retained oxygen gas before the beverage is consumed by the human.

2. Description of Prior Art

The liver of a human has many purposes one of which is to remove toxins from the circulation system of the human body. It is known that oxygen in the circulation system greatly assists in the removal of the toxins. Oxygen is normally supplied within the human body from the respiratory system. However, it has been known that oxygen can also be introduced through the gastro-intestinal tract.

People that are involved in sports and other strenuous activities produce within the muscles lactic acid. The circulation system functions in part to remove the lactic acid since it is a toxin, deposit such in the liver, and the liver causes such to be removed from the body. People that are engaged in regular exercise will often state that it is difficult to perform at an optimum level a regular exercise two days in a row. The reason for this lack of optimal performance on the second day is that this lactic acid has not been efficiently removed and there is still some residual amounts within that person's body. However, if increased amounts of oxygen could be supplied within the individual's body, that increased amount of oxygen would enable the individual to perform at an optimal level on the second day as well as the first day since essentially all the lactic acid will be removed from the body.

The function of oxygen within the blood stream not only helps to detoxify the liver but also functions to increase stamina of the human and optimize mental clarity of the human, that is to think better and faster.

Many diseases of the human reduce the oxygen content in the circulation system and cut down on the consumption of oxygen and assimilation thereof throughout the tissues which leads to an oxygen deficiency known as hypoxia. Some of these diseases are ulcers, gastritis, coliris, liver diseases, hypertension and arteriosclerosis.

The ingesting of an oxygenated cocktail has been known in the past. Reference is to be had to U.S. Pat. No. 4,027,045, issued May 31, 1977, inventors Fedotkin et al., in which the preparing of an oxygenated cocktail for human consumption is discussed. However, the aforementioned patent details a process for preparing a large quantity of such a cocktail rather than an individual amount that is to be ingested by a single individual. It is believed that the process of the aforementioned patent is designed to produce a rather large quantity of this cocktail which is then to be consumed by athletes during athletic events which would then enhance the performance of the athletes. One of the problems having to do with preparing a large quantity of the oxygenated cocktail would inherently require a certain amount of time for this to be consumed. The longer the time period and, in fact, any time period longer than two minutes, would essentially reduce the oxygen content of the cocktail to a level where little or no oxygen would be ingested. The larger quantity of oxygenated cocktail requires a group of people and is not practical for single individuals.

SUMMARY OF THE INVENTION

One of the primary objectives of the present invention is to permit a single individual to prepare a single serving of an oxygenated cocktail which can then be immediately ingested by the user to thereby maximize the effect obtainable from the contained oxygen within the cocktail since the effect of the oxygen will be lost within just a matter of minutes.

The method of the present invention is to use a powder of a specific composition with generally this powder including vitamins, minerals, herbs and a foaming agent. Typical foaming agents would be a soy protein powder or an egg white composition, but other foaming agents could be utilized such as fruit juices, kvass, beer, whey, buttermilk as well as some possible herbs. The user places a powder within an individual sized container which generally would take the form of a glass or cup. The glass or cup would then be substantially filled with a prescribed amount of water, such as twelve ounces, with the temperature of this water being as cold as possible and preferably the temperature being under forty-five degrees and above thirty-three degrees Fahrenheit. The user then evenly mixes the powder and the liquid producing a foamy beverage solution. The desirable liquid would be water, but it is considered to be within the scope of this invention that other liquids could be utilized such as milk, fruit juices and so forth. The user then takes a hand holdable oxygen canister which includes a manually operated valve which is to dispense oxygen through a dispensing tube. The outlet of the dispensing tube is to be located within a glass or cup at the bottom of the beverage and the valve is activated causing dispensing of oxygen from the outlet of the dispensing tube for a short period of time such as six seconds. During the dispensing of the oxygen, the tube is to be moved across the bottom of the beverage or cup to evenly disperse the oxygen throughout the beverage. The valve is then to be deactivated and the dispensing tube removed and the resulting beverage immediately ingested by the human.

DETAILED DESCRIPTION OF THE SHOWN EMBODIMENT

Figure 1:
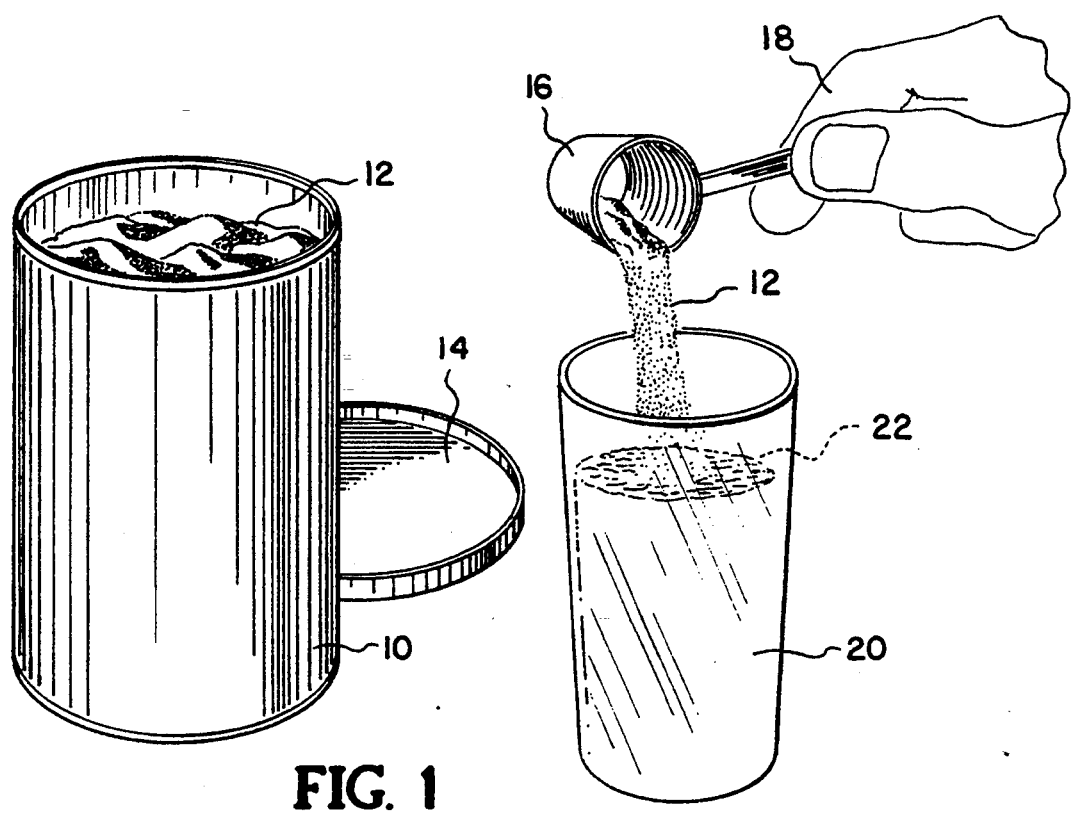
FIG. 1 depicts the placing of a quantity of a powder within a beverage container within which a quantity of liquid has already been located with it being understood that the powder and the liquid is to be then evenly mixed together.
Figure 2:
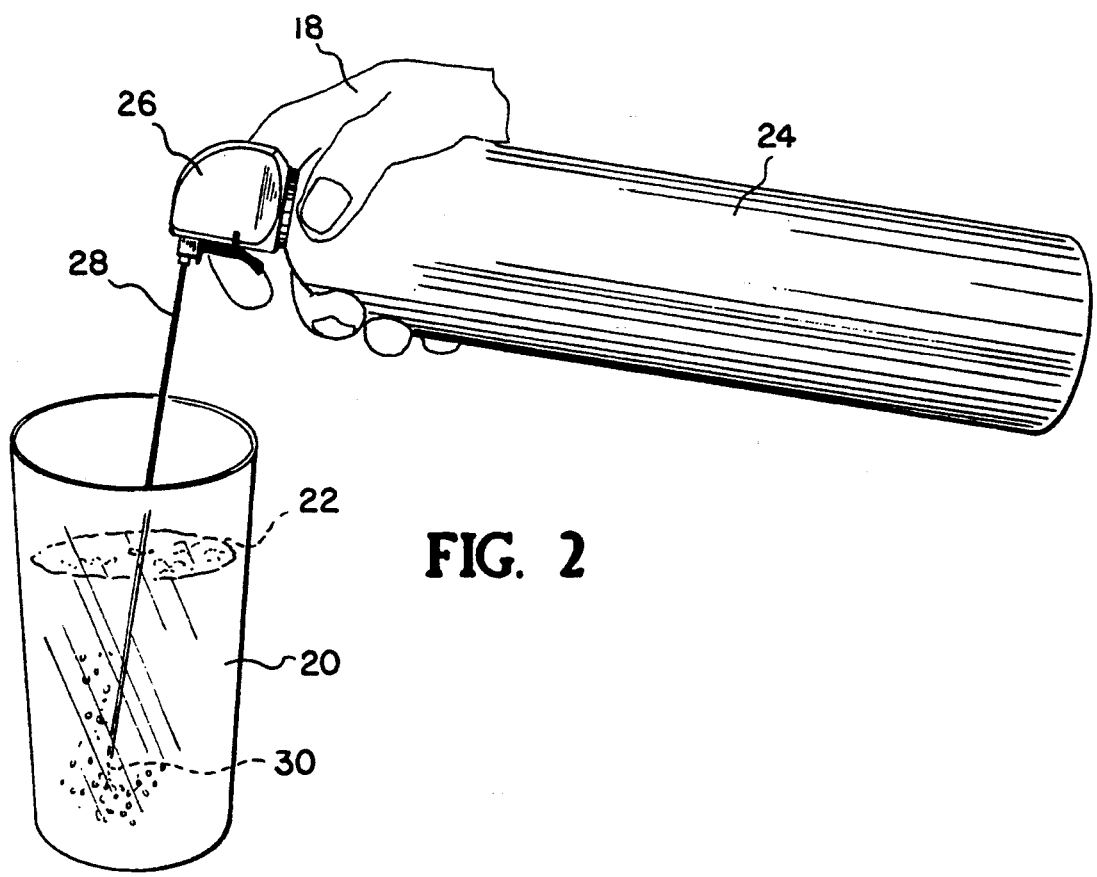
FIG. 2 is a view depicting utilizing of the oxygen canister in order to oxygenate the beverage within the beverage container.

Referring particularly to the drawing there is shown a container 10 which contains a supply of the nutritional powder 12 which is to be utilized in conjunction with the method of the present invention. Powder 12 is normally stored with the container 10 being closed by a lid 14. A scoop 16 is to be utilized by the human 18 to obtain a precise quantity of the powder 12 and this precise quantity of the powder 12 is to be deposited within a single serving beverage container such as a glass 20. Within the glass 20 is already deposited a known amount of liquid 22 such as water. After depositing of the desired amount of powder within the glass 20, scoop 16 is to be replaced back within the container 10 and the lid 14 normally installed in a closed manner thereon. The user 18 then also utilizes some form of a stirring mechanism (not shown) to evenly mix the powder 12 and the liquid 22.

After the powder 12 and the liquid 22 is evenly mixed, a foam is created in the beverage, that is, becomes frothy. The user then utilizes an oxygen canister 24 which has a manually operated valve mechanism 26 from which a dispensing tube 28 extends. The dispensing tube 28 terminates in an outlet 30 with this outlet 30 to be located directly adjacent the bottom of the glass 20. The user manually activates the valve 26 causing oxygen to be dispensed from the canister 24 through the outlet 30. The outlet 30 is to be wiggled or otherwise moved across the bottom of the container 20 so as to substantially evenly dispurse the oxygen within the nutritional beverage contained within the container 20. This nutritional beverage includes foam with this foam functioning to trap and hold the molecules of oxygen for a short period of time. The valve 26 is to be activated for approximately six to ten seconds in time. After this six second time period, the tube 28 is to be removed from the container 20 and the user 18 immediately ingests the beverage contained within the container 20.

It is to be understood that it is within the scope of this invention that powder 12 can be composed of numerous ingredients. Actually within some countries certain ingredients are prohibited while in other countries such are permitted. Therefore, a composition for one country will almost assuredly vary from a composition of another country. One typical combination of ingredients that have been found to be satisfactory is as follows:

Maltodextrin (short, medium and long chain glucose polymers), low glycemic index Pure Crystalline Fructose, Soy protein powder, Yerba Mate (Ilex Paraguariensis), Sarsaparilla (Smilax Officinalis), Siberian Ginseng (Eleuthrococcus Senticosus), Gotu Kola (Hydrocotyl Asiatica), Yucca Spp, Wild Yam (Dioscorea Villosa), natural and artificial flavors, Tri-Calcium Phosphate, Xanthan Gum, Choline Citrate, Ascorbic Acid, Vitamin E Acetate, Magnesium Oxide, Ferrous Fumarate, Niacinamide, Zinc Oxide, Calcium Pantothenate, Vitamin A Palmitate, L-valine, L-leucine, L-isoleucine (branched chain amino acid blend), Copper Sulfate, Vitamin D, Pyridoxine Hydrochloride, Octacosanol, Riboflavin, Thiamine Mononitrate, Chromium Polynicotinate, Biotin, Folic Acid, Potassium Iodine, Potassium Aspartate, Magnesium Aspartate, Cyanocobalamin.

The serving size of the scoop 16 is projected to be about forty-two grams with the scoop having a volume of sixty cubic centimeters. The number of calories within the serving size is about one hundred and fifty. The amount of protein is three grams, the amount of carbohydrates is thirty-four grams with complex carbohydrates comprising eighteen grams and simple carbohydrates comprising sixteen grams. The amount of fat is less than one gram. The amount of sodium is seventy milligrams with there being ten milligrams of potassium and one gram of dietary fiber.

Each serving size is to obtain a hundred percent of the U.S. recommended daily allowances of the following vitamins and minerals, Vitamin A, Vitamin C, thiamin, riboflavin, niacin, iron, Vitamin D, Vitamin E, Vitamin B6, Vitamin B12, iodine, zinc, copper, biotin and pentothinic acid. Also there will be obtained four percent protein, fifteen percent calcium, fifty percent folic acid, ten percent phosphorous and ten percent magnesium. There will also be obtained a hundred micrograms of Chromium, one thousand micrograms of Octacosanol and one hundred milligrams of Choline Citrate.

The oxygen gas contained within the canister 24 is compressed to about one hundred seventy five pounds per square inch. The preferable type of water for liquid 22 would be demineralized or distilled water. Because it is desired to have the liquid 22 be as cold as possible, it would even be satisfactory to include some ice cubes as part of the liquid 22. The foam within the liquid 22 traps the oxygen gas in tiny bubbles and the liquid 22 is then ingested into the stomach of the user along with this oxygen gas with the oxygen gas to then be absorbed into the portal vein running around the stomach. Liquid 22 cannot only be consumed by people engaged in strenuous exercise but it also can be utilized by any individual who wants a mentally uplifting, nutritional drink. The liquid 22 contains the vitamins and minerals which tend to replenish the substances lost by humans during severe exercise.

What is claimed is:

1. The method of preparing an oxygenated nutritional beverage for individual consumption by a human comprising the steps of:

utilizing an individual beverage container adapted to contain a single serving of a beverage for a human;

depositing a precise amount of a nutritional powder within said container wherein said powder includes a foam generating substance capable of trapping and temporarily holding oxygen gas;

adding a preselected quantity of a liquid to said powder within said container;

evenly mixing said powder and said liquid for a sufficient period of time to create as much foam as possible within said beverage;

utilizing a hand-holdable oxygen canister which has an elongated dispensing tube with an oxygen outlet and a manually operated oxygen dispensing valve;

locating said dispensing tube within said container and submerging said outlet to be located directly adjacent the lowest level of said beverage;

activating said valve for an approximate preselected period of time permitting oxygen to be dispensed within said beverage;

deactivating said valve terminating dispensing of the oxygen and removing said tube from said container; and immediately ingesting said beverage by the human which will cause the contained oxygen gas in said beverage to be made available to enter the blood stream of the human improving the performing capability of the human within the next several hours.

2. The method as defined in claim 1 wherein the time period for the step of immediately ingesting said beverage is no more than two minutes.

3. The method as defined in claim 1 wherein the time period for said activating step being within the range of six to ten seconds.

4. The method as defined in claim 1 wherein said locating step includes moving of said outlet of said dispensing tube within said container during the time that oxygen is being dispensed from said dispensing tube.

5. The method as defined in claim 1 wherein said foam generating substance includes either a soy protein powder or an egg white composition.

6. The method as defined in claim 5 wherein the step of immediately ingesting said beverage is within the time period of two minutes.

7. The method as defined in claim 6 wherein the time period for said activating step being approximately six seconds.

8. The method as defined in claim 7 wherein said locating step includes moving of said outlet of said dispensing tube within said container during the time that oxygen is being dispensed from said dispensing tube.

9. The method as defined in claim 8 wherein within the adding step the temperature of said liquid is within the range of thirty-three to forty-five degrees Fahrenheit.

* * * * *